(12) United States Patent
Bascle et al.

(10) Patent No.: US 7,881,531 B2
(45) Date of Patent: Feb. 1, 2011

(54) ERROR PROPOGATION AND VARIABLE-BANDWIDTH MEAN SHIFT FOR FEATURE SPACE ANALYSIS

(75) Inventors: Benedicte Bascle, Plainsboro, NJ (US); Dorin Comaniciu, Princeton, NJ (US); Anurag Mittal, Plainsboro, NJ (US); Visvanathan Ramesh, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 83 days.

(21) Appl. No.: 12/198,349

(22) Filed: Aug. 26, 2008

(65) Prior Publication Data
US 2009/0148046 A1    Jun. 11, 2009

Related U.S. Application Data

(62) Division of application No. 10/382,437, filed on Mar. 6, 2003, now Pat. No. 7,437,006.

(60) Provisional application No. 60/362,015, filed on Mar. 6, 2002.

(51) Int. Cl.
*G06K 9/34* (2006.01)
*G06K 9/00* (2006.01)
*G06K 9/62* (2006.01)
*G06K 9/68* (2006.01)

(52) U.S. Cl. ........................ 382/180; 382/173; 382/224; 382/225; 382/226; 382/227; 382/228

(58) Field of Classification Search .................. 382/180, 382/181
See application file for complete search history.

(56) References Cited

U.S. PATENT DOCUMENTS 6,731,799 B1 * 5/2004 Sun et al. ..................... 382/173
2007/0031005 A1 * 2/2007 Paragios et al. ............. 382/103

OTHER PUBLICATIONS

Elgammal et al., "Background and Foreground Modeling Using Nonparametric Kernel Density Estimation for Visual Surveillance", Jul. 2002, Proceedings of the IEEE, vol. 90, No. 7, pp. 1151-1163.*

* cited by examiner

*Primary Examiner*—Anand Bhatnagar
*Assistant Examiner*—Randolph Chu
(74) *Attorney, Agent, or Firm*—Donald B. Paschburg; F. Chau & Associates, LLC (57) ABSTRACT

The present invention comprises using error propagation for building feature spaces with variable uncertainty and using variable-bandwidth mean shift for the analysis of such spaces, to provide peak detection and space partitioning. The invention applies these techniques to construct and analyze Hough spaces for line and geometrical shape detection, as well as to detect objects that are represented by peaks in the Hough space. This invention can be further used for background modeling by taking into account the uncertainty of the transformed image color and uncertainty of the motion flow. Furthermore, the invention can be used to segment video data in invariant spaces, by propagating the uncertainty from the original space and using the variable-bandwidth mean shift to detect peaks. The invention can be used in a variety of applications such as medical, surveillance, monitoring, automotive, augmented reality, and inspection.

20 Claims, 7 Drawing Sheets

Hough accumulator (with error propagation) associated with an image

FIG. 3

Image

Extracted lines (corresponding to local maxima of the Hough accumulator)

ERROR PROPOGATION AND VARIABLE-BANDWIDTH MEAN SHIFT FOR FEATURE SPACE ANALYSIS

CROSS REFERENCE TO RELATED APPLICATION

This application is a Divisional Application of U.S. Non-Provisional application Ser. No. 10/382,437 filed Mar. 6, 2003 now U.S. Pat. No. 7,437,006, which claims the benefit of U.S. Provisional Application Ser. No. 60/362,015 filed on Mar. 6, 2002, which is incorporated by reference herein in its entirety.

FIELD OF THE INVENTION

This invention relates to variable-bandwidth peak detection in Hough space used for the detection of lines and geometrical shapes in video occurring in a variety of application domains, such as medical, automotive, inspection, and augmented reality. It further relates to error-propagation for uncertainty modeling in joint motion-color space for modeling of dynamic backgrounds in a variety of application domains, such as surveillance and monitoring. Furthermore, the invention relates to variable-bandwidth peak detection in joint color-spatial domains used for video segmentation occurring in various application domains, such as medical and object detection.

BACKGROUND OF THE INVENTION

Background Modeling forms a central module in systems using Computer Vision to detect events of interest in a video stream. Most current methods use only the intensity observed at a pixel. Such a model is reasonable when the background is stationary. However, these methods deteriorate in their discrimination power when the background is dynamic. Examples of these include ocean waves, waving trees, rain, moving clouds, and camouflaged objects that are camouflaged such that they are of similar color as the background of the object.

A Hough Transform is a method for detecting straight lines and curves on gray level images. For line detection, the equation of a line can be expressed as $\rho = x\cos(\theta) + y\sin(\theta)$, where $\theta$ and $\rho$ are the line orientation and the line distance from origin to the line, respectively. A line is therefore, completely specified by a parameter pair $(\theta, \rho)$. For straight line detection, the Hough Transform maps each pixel $(x,y)$ from the image space into a parameter space of $(\theta, \rho)$, where contributions from each feature point to each possible set of $(\theta, \rho)$, which are accrued. For this purpose, the parameter space is divided into cells with each cell corresponding to a pair of quantized $(\theta, \rho)$. A multi-dimensional accumulator array is often used to represent the quantized space. For each feature point, all the parameters associated with the point are estimated, the corresponding cells of the accumulator are incremented accordingly. This is repeated for all feature points. Lines are found by searching the accumulator array for peaks. The peaks correspond to the parameters of the most likely lines.

The standard Hough Transform adopts a "top hat" strategy to compute the contribution of each point to a hypothesized line. Specifically, the scheme assumes all feature points located within a close range of the hypothesized line contribute equally to the line. The accumulator is, therefore, incremented by a unit for those feature points. This scheme is inadequate in that data points are not all equally reliable. This means that line parameters derived from each feature point may carry different uncertainties due to the following reasons. Most Hough Transform techniques employ certain techniques for estimating the orientation of feature points (edgels) to restrict the ranges of values of $\theta$ a pixel may vote for. The estimation of the orientation of each edge pixel is often uncertain due to: 1) image noise, for example, positional errors from quantization and sensor errors, 2) small neighborhood associated with the edge detection procedure and the inherent uncertainty with the procedure, and 3) the parametric representation used to define a line. Therefore, feature points vary in uncertainties and should not be treated equally.

Previous efforts in algorithm improvement to Hough Transforms focused on improving the computational efficiency of the Hough Transform, that is, speed and memory. Early efforts in this aspect concentrated on reducing the number of bins used for tessellating the parameter space. Many proposed techniques drew on some form of coarse-to-fine search strategy resulting in a dramatic reduction of cells.

Recent efforts have been focusing on sampling the feature points. The idea is to use only a subset of image features. These efforts give rise to different probabilistic, also called randomized, Hough Transform techniques which increase the computational efficiency and decrease memory usage by means of sampling the image feature space.

Therefore, a need exists for a unified framework that utilizes the uncertainty of transformed data for peak detection and clustering in feature space. A further need exists for a method for background modeling that is able to account for dynamic backgrounds that change according to a certain pattern. A still further need exists to analyze Hough Transforms that are built with uncertainty and a need exists for video segmentation in invariant color spaces.

SUMMARY OF THE INVENTION

An embodiment of the present invention comprises using error propagation for building feature spaces with variable uncertainty and using variable-bandwidth mean shift for the analysis of such spaces, to provide peak detection and space partitioning. The invention applies these techniques to construct and analyze Hough spaces for line and geometrical shape detection, as well as to detect objects that are represented by peaks in the Hough space. This invention can be further used for background modeling by taking into account the uncertainty of the transformed image color and uncertainty of the motion flow, to be used in application domains, such as surveillance and monitoring. Furthermore, the invention can be used to segment video data in invariant spaces, by propagating the uncertainty from the original space and using the variable-bandwidth mean shift to detect peaks.

An embodiment of the present invention comprises providing input data to be analyzed from a domain, developing an uncertainty model of the input data in a feature space, and using variable bandwidth mean shift to detect an object of interest.

Another embodiment of the present invention includes deriving the uncertainty model through error propagation.

A further embodiment of the present invention comprises feature space including joint spatial-color space.

A further embodiment of the present invention comprises feature space including invariant space.

A further embodiment of the present invention comprises feature space including parameter space.

A further embodiment of the present invention comprises feature space including joint motion-color space.

A further embodiment of the present invention comprises domains including one or more of medical, surveillance, monitoring, automotive, inspection, and augmented reality.

Another embodiment of the present invention comprises modeling a background using multiple features and uncertainties.

Another embodiment of the present invention comprises modeling a background using multiple features and uncertainties wherein the multiple features include one or more of color, texture, and motion.

A further embodiment of the present invention comprises analyzing a video frame and adding a vector of features to a background model.

A further embodiment of the present invention comprises analyzing a video frame and detecting a change by evaluating a vector of features and a background model.

A still further embodiment of the present invention comprises applying morphological operations to the detections.

The embodiments of the present invention will become more apparent from the following detailed description of illustrative embodiments thereof, which is to be read in connection with the accompanying drawings.

DETAILED DESCRIPTION OF PREFERRED EMBODIMENTS

Figure 1:
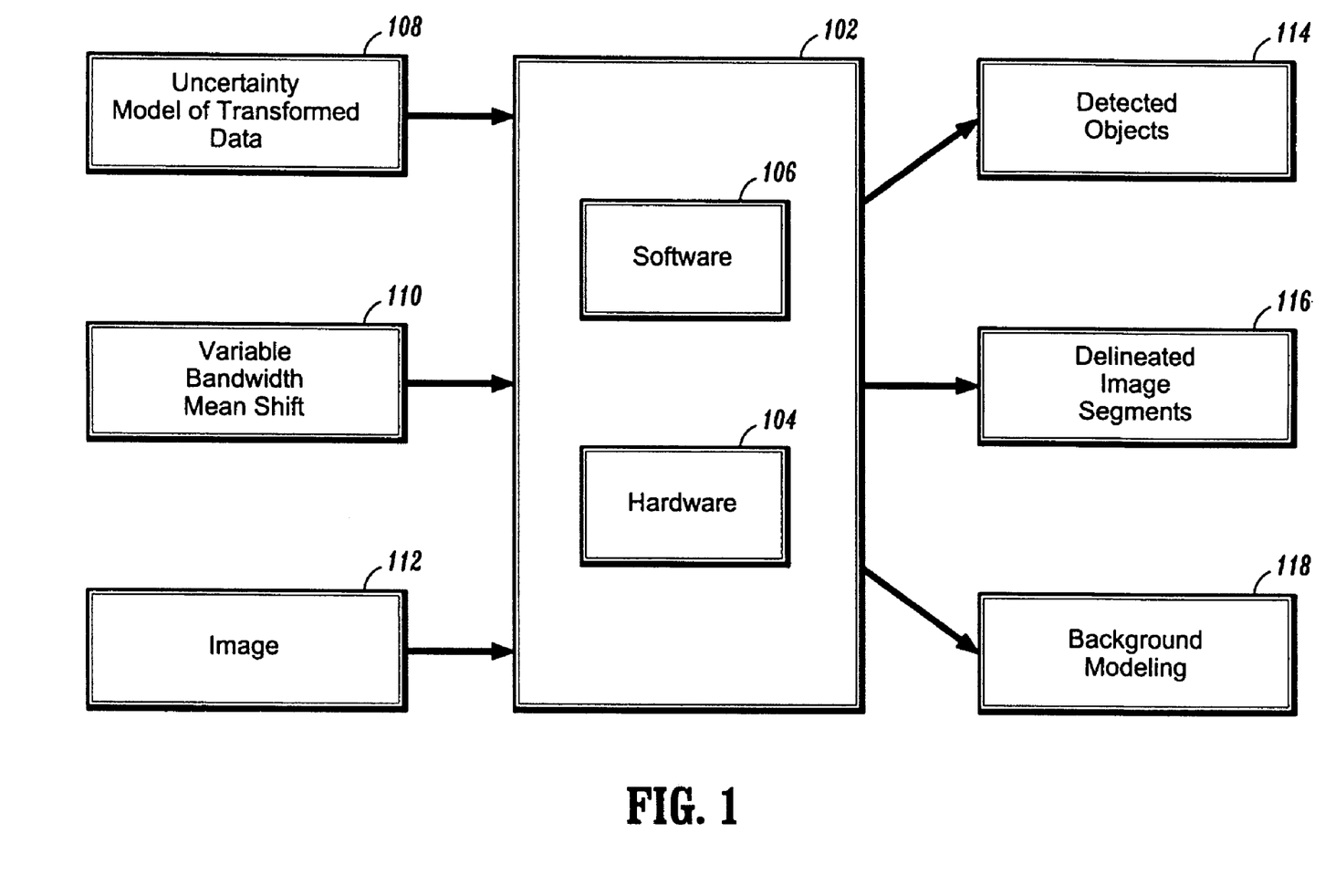
FIG. 1 illustrates a functional block diagram according to an embodiment of the present invention.

Referring to FIG. 1 a computer system 102 having a hardware component 104, for example, a server and storage device, and software component 106, for example, an operating system and computer programs, according to an embodiment of the present invention receives input of an uncertainty model of transformed data 108, variable bandwidth shift mean 110, and an image 112 that is to be segmented. Peaks of feature space are used to detect lines and objects 114. Valleys surrounding the density modes for delineating image segments are used to delineate image segments 116. The peaks of feature spaces are used to model a background 118 of image 112.

A method according to an embodiment of the present invention comprises using error propagation to build feature spaces, analyzing feature spaces that are built with uncertainty using variable-bandwidth mean shift to provide pixels and clustering of the feature spaces. Variable bandwidth mean shift identifies modes in joint spatial color space, while image segments are delineated by detecting valleys surrounding the modes. The main statistical tool that can utilize the variable uncertainty is variable-bandwidth mean shift, an adaptive estimator of density gradient. This technique is applied to detect high density points, that is, modes, in the feature space. The feature space can be the Hough space, the joint motion-color space, or the joint image-color space.

Figure 2:
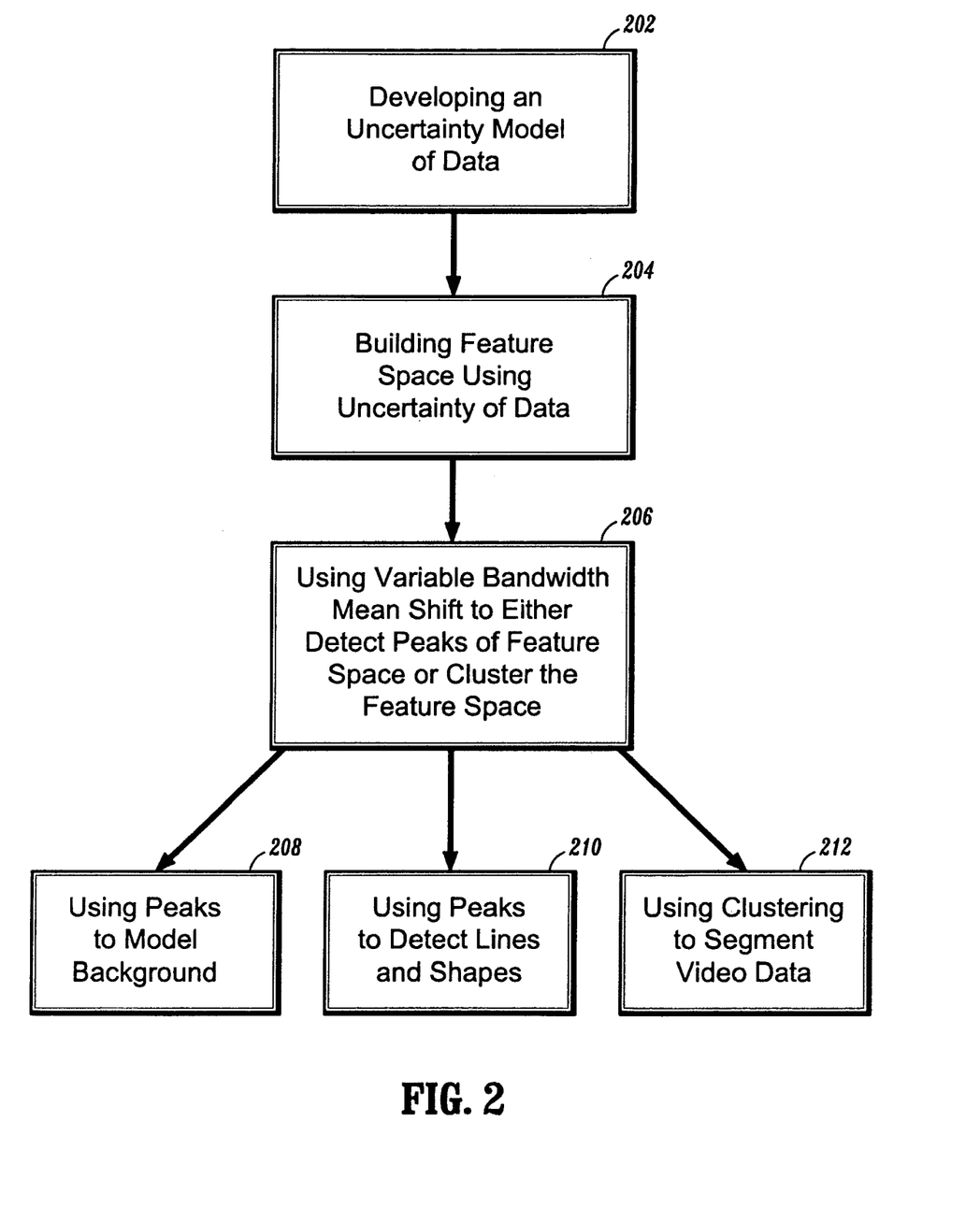
FIG. 2 is a flow diagram illustrating a method using variable bandwidth mean shift according to an embodiment of the present invention.

Referring to FIG. 2, a method according to an embodiment of the present invention comprises analysis of feature space of input data by developing an uncertainty model of transformed data wherein the uncertainty model is used to build a feature space to be analyzed by applying variable bandwidth mean shift. By applying variable bandwidth mean shift to a feature space, peaks in feature space can be used to model a background of an image (step 208) and to detect lines and shapes (step 210). Additionally, applying variable bandwidth mean shift allows clustering of feature space to segment video data (step 212). To apply variable bandwidth mean shift to feature space, an uncertainty model of transformed data has to be developed (step 202). The uncertainty model of step 202 is then used to build a feature space (step 204) that will be analyzed by using variable bandwidth mean shift (step 206).

Using variable bandwidth mean shift to analyze feature space (step 206) can be described by beginning with a set of d-dimensional points, $x_i$, i=1 ... n, that exists in space $R^d$ and a symmetric positive definite d×d bandwidth matrix $H_i$ that is defined for each data point $x_i$. The matrix $H_i$ quantifies the uncertainty associated with $x_i$. The sample point density estimator with d-variate normal kernel, computed at the point x is given by $$\hat{f}_v(x) = \frac{1}{n(2\pi)^{d/2}} \sum_{i=1}^{n} \frac{1}{|H_i|^{1/2}} \exp\left(-\frac{1}{2}D^2(x, x_i, H_i)\right), \text{ where}$$

$$D^2(x, x_i, H_i) \equiv (x - x_i)^T H_i^{-1}(x - x_i)$$

is the Mahalanobis distance from x to $x_i$. $H_h$ is the data-weighted harmonic mean of the bandwidth matrices computed at x $$H_h^{-1}(x) = \sum_{i=1}^{n} w_i(x) H_i^{-1},$$

where the weights $$w_i(x) = \frac{\frac{1}{|H_i|^{1/2}} \exp\left(-\frac{1}{2}D^2(x, x_i, H_i)\right)}{\sum_{i=1}^{n} \frac{1}{|H_i|^{1/2}} \exp\left(-\frac{1}{2}D^2(x, x_i, H_i)\right)}$$

satisfy $\sum_{i=1}^{n} w_i(x) = 1$. An estimator of the gradient of the true density is the gradient of $\hat{f}_v$ $$\hat{\nabla} f_v(x) \equiv \nabla \hat{f}_v(x) = \frac{1}{n(2\pi)^{d/2}} \sum_{i=1}^{n} \frac{H_i^{-1}(x - x_i)}{|H_i|^{1/2}} \exp\left(-\frac{1}{2}D^2(x, x_i, H_i)\right).$$

By multiplying the above to the left with $H_h(x)$, it results that $$H_h(x) \hat{\nabla} f_v(x) = f(\hat{x}) m_v(x),$$

where

-continued $$m_v(x) \equiv H_h(x) \sum_{i=1}^{n} w_i(x) H_i^{-1} x_i - x$$

is the variable-bandwidth mean shift vector. From the above, $$m_v(x) \equiv H_h(x) \frac{\nabla \hat{f}_v(x)}{\hat{f}_v(x)},$$

which shows that the variable-bandwidth mean shift vector is an adaptive estimator of the normalized gradient of the underlying density.

If the bandwidth matrices $H_i$ are all equal to a fixed matrix H, called analysis bandwidth, the sample point estimator reduces to the simple multivariate density estimator with normal kernel $$\hat{f}(x) = \frac{1}{n|2\pi H|^{1/2}} \sum_{i=1}^{n} \frac{1}{|H_i|^{1/2}} \exp\left(-\frac{1}{2} D^2(x, x_i, H)\right).$$

Then $m(x) \equiv H(x) \frac{\nabla \hat{f}(x)}{\hat{f}(x)}$, where $$m(x) = \frac{\sum_{i=1}^{n} x_i \exp\left(-\frac{1}{2} D^2(x, x_i, H_i)\right)}{\sum_{i=1}^{n} \exp\left(-\frac{1}{2} D^2(x, x_i, H_i)\right)} - x$$

is the fixed-bandwidth mean shift vector.

A mode seeking algorithm can be derived by iteratively computing the fixed- or variable-bandwidth mean shift vector. The partition of the feature space is obtained by grouping together all the data points that converged to the same mode.

Step 202 includes developing an uncertainty model of data. Location dependent uncertainty, such as, covariance matrices, in invariant space will now be described. For a given location (x,y) in the image, denote $\hat{R}(x,y)$, $\hat{G}(x,y)$, $\hat{B}(\hat{x},y)$ the observed color data. Assume that $\hat{R}$, $\hat{G}$, and $\hat{B}$ are normal with mean R, G, and B, and identical standard deviation σ. To derive uncertainties in normalized color space, certain computations can be utilized.

The illumination prior assumption is that a scene contains multiple light sources with the same spectral distribution with no constraint on individual intensities. An invariant representation of color data is obtained through the transformation $T:R^3 \rightarrow R^2$ which normalizes R and G by S=R+G+B $$r = \frac{R}{R+G+B} \quad g = \frac{G}{R+G+B}$$

In Step 204 a feature space is built using the uncertainty of data described above. Due to the nonlinear character of the transformation T(.), uncertainties in the normalized estimates $\hat{r}$ and $\hat{g}$ are dependent not only on sensor noise variance, but also on actual true unknown values of the underlying samples. Based on the assumption of a moderate signal to noise ratio, such as σ<<S, $(\hat{r},\hat{g})^T$ can be approximated as normal distributed with pixel-dependent covariance matrix $$\begin{pmatrix} \hat{r} \\ \hat{g} \end{pmatrix} \sim N\left(\begin{pmatrix} r \\ g \end{pmatrix}, \sum_{\hat{r},\hat{g}}\right)$$

where $$\sum_{\hat{r},\hat{g}} = \begin{pmatrix} \sigma_{\hat{r}}^2 = E[(\hat{r}-r)^2] & E[(\hat{r}-r)(\hat{g}-g)] \\ E[(\hat{r}-r)(\hat{g}-g)]\sigma_{\hat{g}}^2 = E[(\hat{g}-g)^2] \end{pmatrix}$$

$$= \frac{\sigma^2}{S^2} \begin{pmatrix} 1 - \frac{2R}{s} + 3\frac{R^2}{s^2} - \frac{R+G}{s} + 3\frac{RG}{s^2} - \\ \frac{R+G}{s} + 3\frac{RG}{s^2} 1 - \frac{2G}{s} + 3\frac{G^2}{s^2} \end{pmatrix}$$

In normalized space the covariance matrix for each pixel is different: darker regions in the RGB image, that is variable small S, correspond to regions with high variance in a normalized image.

A similar technique can be used to compute optical flow and motion vectors with their associated uncertainties. Preferably the present invention employs optical flow and motion vector techniques described in *Bayesian Multi-scale Differential Optical Flow*, E. P. Simoncelli, *Handbook of Computer Vision and Applications* (1999), Vol. 2; Chapter 14; pages 397-422, which is incorporated by reference herein in its entirety.

To model a background (step 208), detect lines and shapes (step 210), and segment video data (step 212), a Hough Transform can be used. A Hough Transform is a technique to represent geometrical structures by voting. The main idea is that a change in representation converts a point grouping problem into a peak detection problem. When detecting lines, every point "votes for" any line it might belong to. In discretized line parameter space, each bucket represents a particular line. The bucket contains the number of edges that support that line segment. Large buckets in Hough space correspond to lines in point space. The original Hough approach does not take into account any possible uncertainty in the positions and orientations of the points voting for possible lines. A variant of the Hough Transform can be described where the votes of points for lines are a function of the uncertainty in the positions and orientations of those points.

Figure 3:
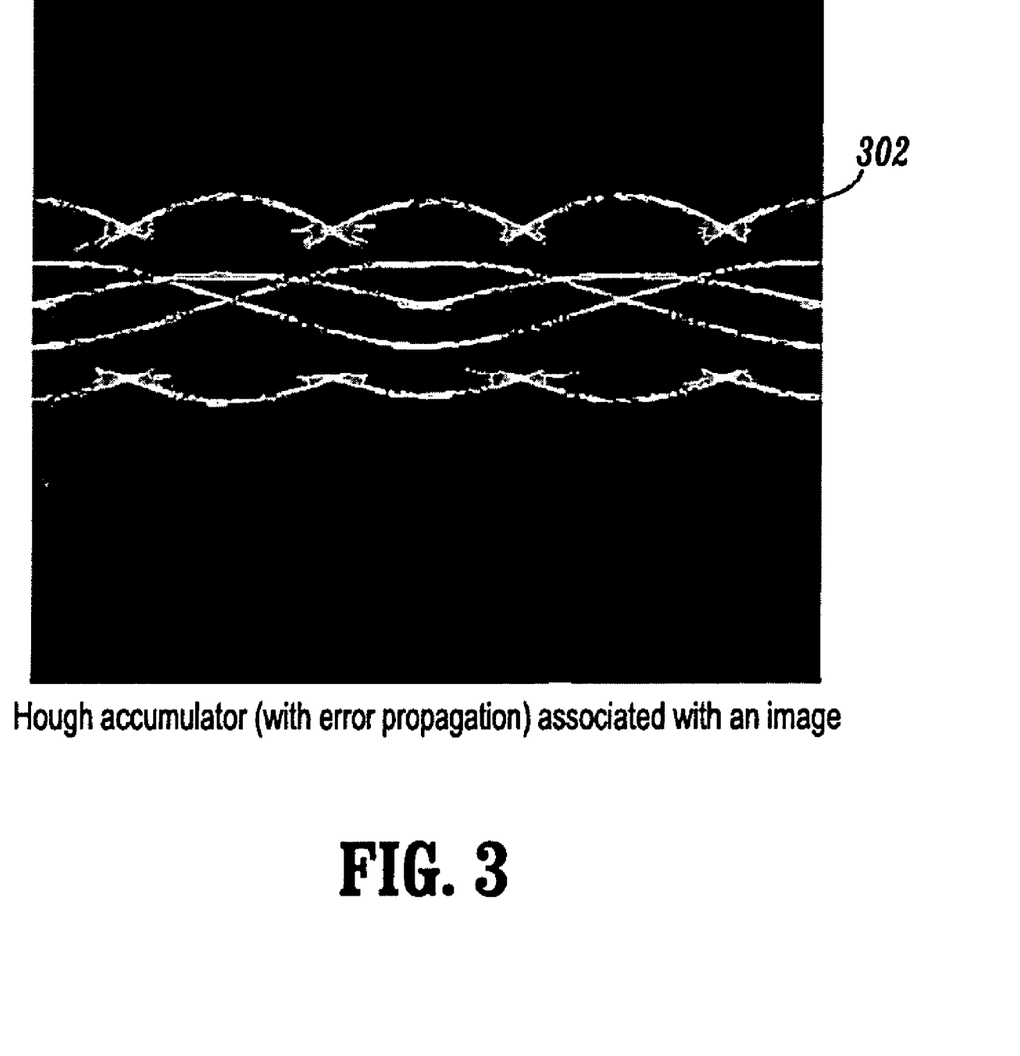
FIG. 3 depicts a Hough accumulator with error propagation.
Figure 4:
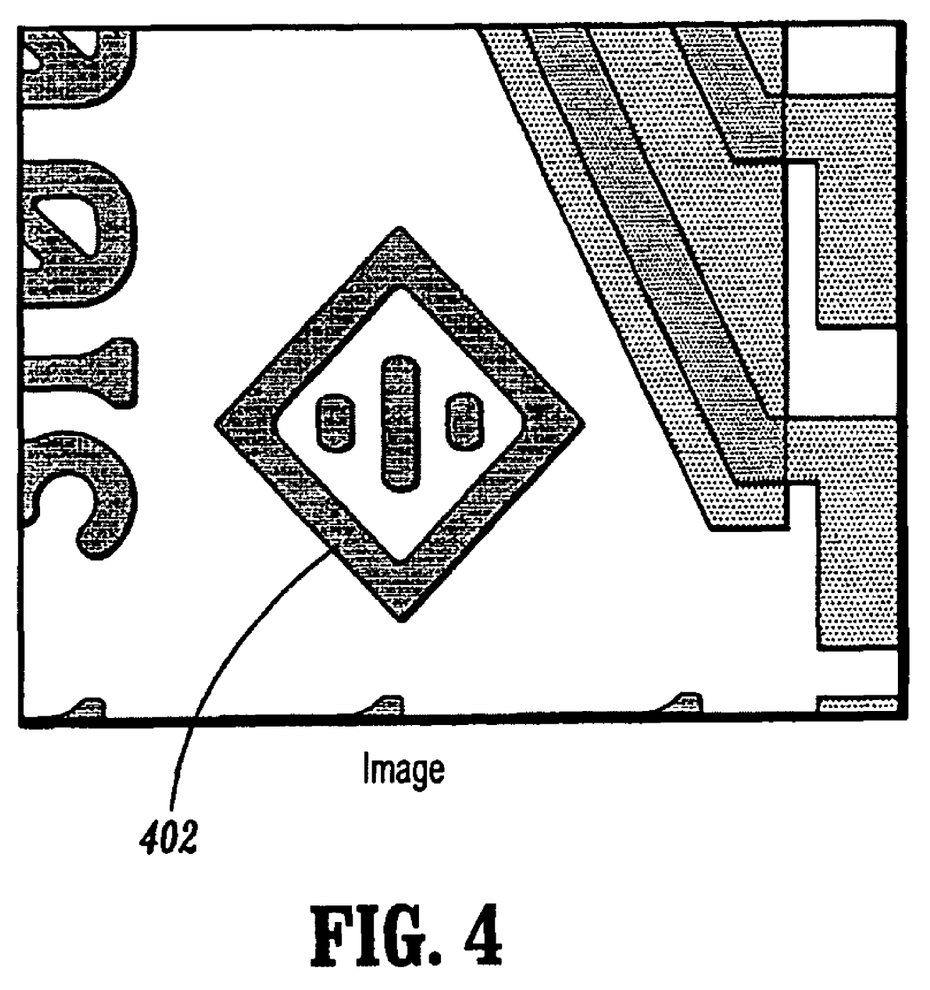
FIG. 4 depicts an input image for edge detection.

FIG. 3 illustrates Hough accumulators with error propagation associated with an input image, such as input image 402 as shown in FIG. 4. The Hough accumulators with error propagation results are shown as lines 302 that correspond to attributes of the input image 402. The Hough Transform proceeds by applying edge detection I(x, y) to the input image 402. This can be done using a number of different filters, such as, Prewitt, Sobel, and Canny. The outputs of the edge detection are a list of edge points $(x_i, y_i)$ i=1. N, the magnitude of the gradient as measured at each edge point $\|g(x_i, y_i)\|$, and the orientation of the gradient at the edge points $\theta_i$. The uncertainty associated with the outputs of the edge detection can be estimated by error propagation. The uncertainty associated with the coordinates of an edge point $(x_i, y_i)$ is noted $\sigma_p = \sigma_x = \sigma_y$. Assuming that the uncertainty is the same in x and y and that x and y are uncorrelated. When image noise is small, $\sigma_p$ is generally dominated by discretization errors due to image resolution, for example $\sigma_p=0.5$ pixel.

The uncertainty of the orientation of the gradient at point $(x_i,y_i)$ is noted $\sigma_\theta$. Most often, edge detection is performed by: (1) smoothing and differentiating the image along x and y using linear filters, (2) estimating the norm of the gradient $$\|g\|\sqrt{I_x^2+I_y^2},$$

(3) extracting the local maxima of the norm of the gradient in the image, which are edge points, and (4) estimating the orientation $\theta=\arctan(I_y/I_x)$ In a first approximation, it can be considered that non-maxima suppression has no influence on the variance of $\theta$ and influences only the miss and false positive rates of edge detection. If image smoothing and differentiation is performed by a linear filter W, it can be shown that $\sigma_\theta^2=C_W*(\sigma^2/\|g\|^2)$ where $\sigma^2$ is the variance of the image intensity and $C_W$ is a constant related to the coefficients of the linear filter W.

Figure 5:
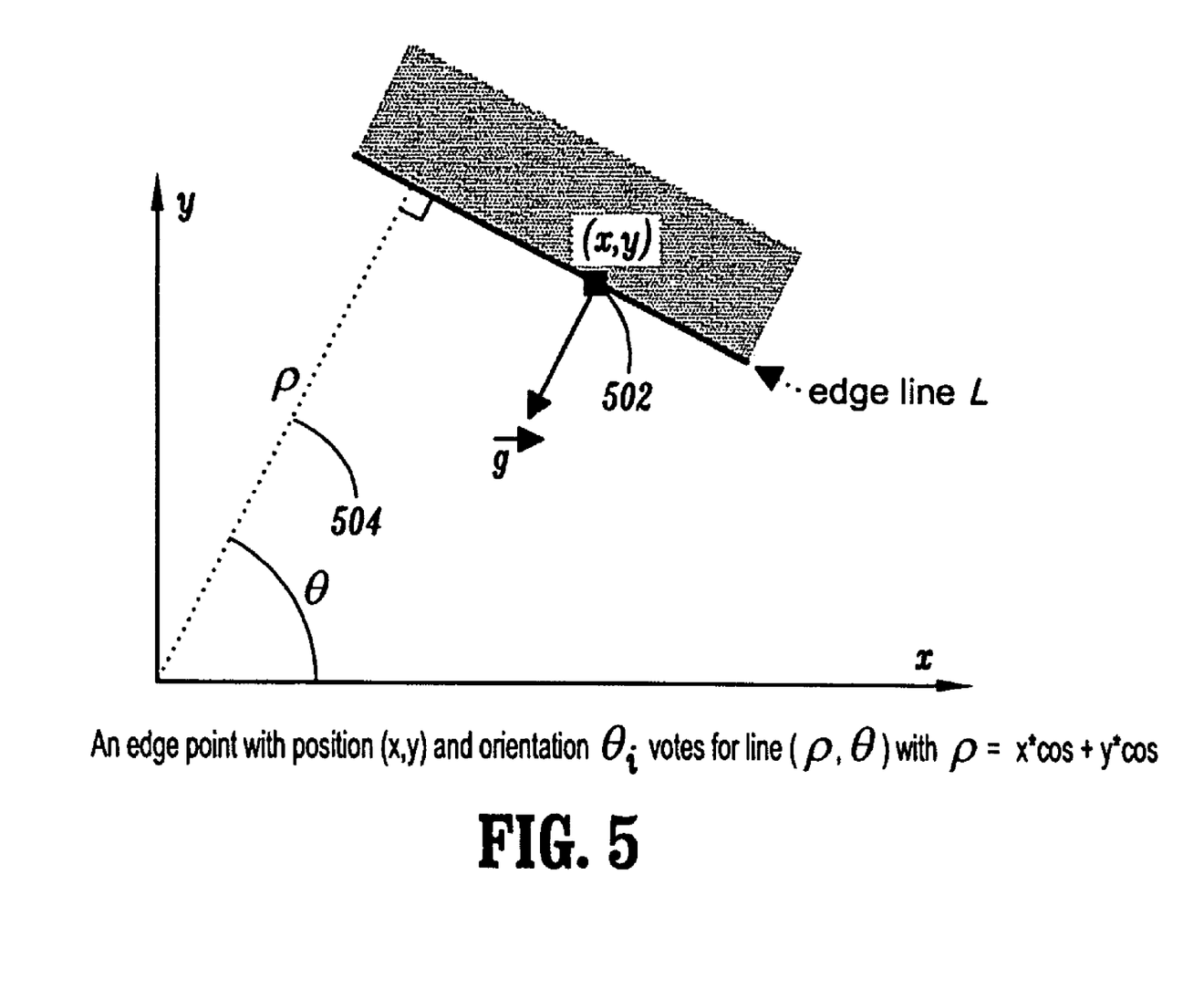
FIG. 5 illustrates a graph of an edge point.

Referring to FIG. 5, an edge point 502 $(x_i,y_i)$ with estimated gradient orientation $\theta_i$ votes for line $\Theta=(\rho, \theta)$ 504 with $\rho=x*\cos\theta+y*\sin\theta$. The covariance matrix associated with such a vote is $$\Sigma(\Theta)=\begin{pmatrix}\sigma_\rho^2 & \sigma_{\rho\theta} \\ \sigma_{\rho\theta} & \sigma_\theta^2\end{pmatrix}$$

with $\sigma_\rho^2=k^2\sigma_\theta^2+\sigma_p^2$ and $\sigma_{\rho\theta}=k\sigma_\theta^2$ and $k=y\cos\theta-x\sin\theta$. Because of the uncertainty associated with the vote $\Theta=(\rho,\theta)$, the edge point 502 (x,y) votes not only in bin $\Theta=(\rho,\theta)$ but also in the adjacent bins. The contribution of (x,y) to each bin in Hough space is equal to:

$$N(\hat{\Theta},\Sigma_{\hat{\Theta}})=\frac{1}{2\prod|\Sigma_{\hat{\Theta}}|^{\frac{1}{2}}}e^{-\frac{1}{2}(\hat{\Theta}-\Theta)^T\Sigma_{\hat{\Theta}}^{-1}(\hat{\Theta}-\Theta)}$$

Figure 6:
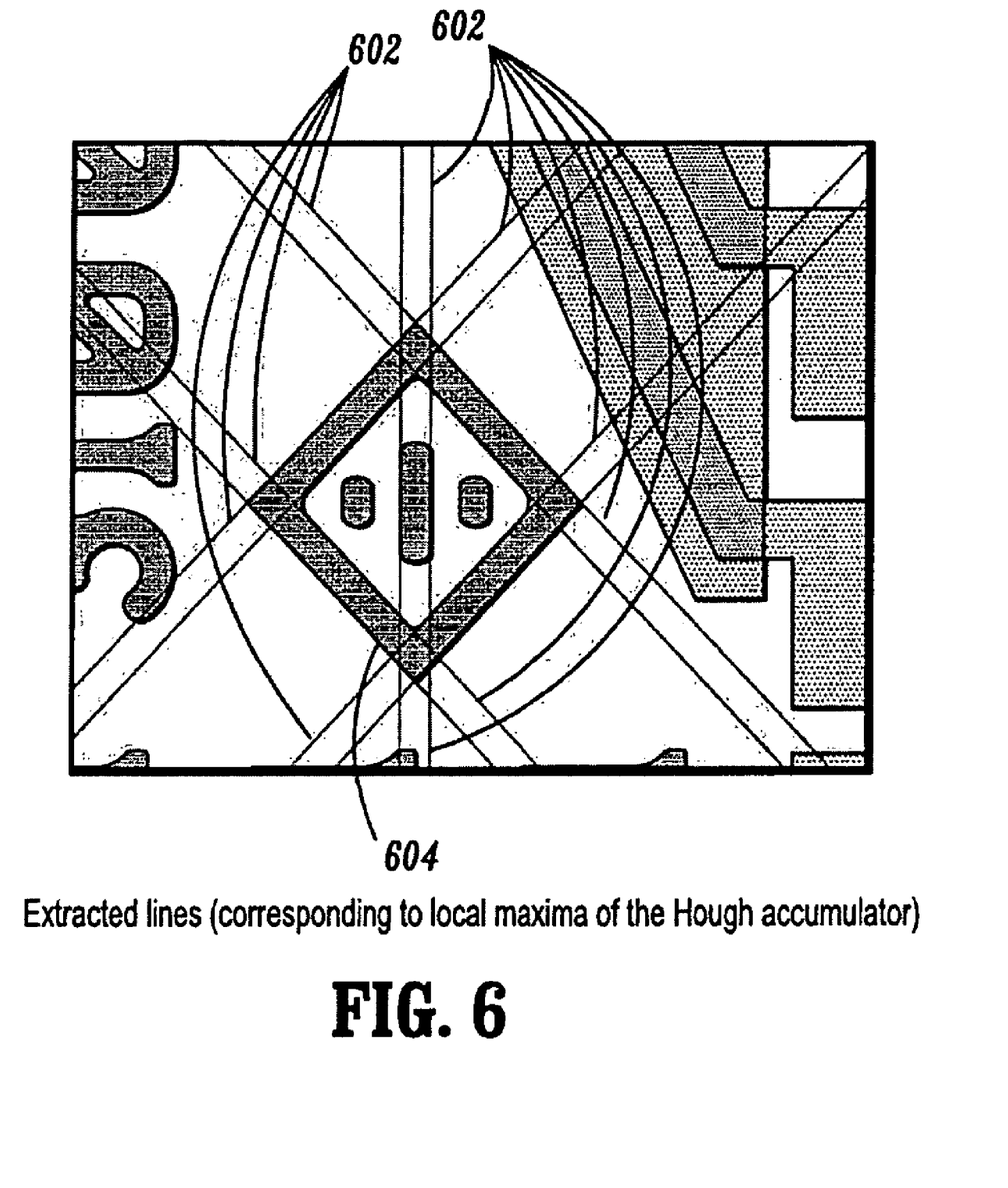
FIG. 6 illustrates extracted lines corresponding to local maxima of the Hough Accumulator.

Referring to FIG. 6, when all image edge points have voted in the Hough accumulator, local maxima of the Hough accumulator correspond to lines 602 in the image 604. The Generalized Hough Transform applies a similar procedure to the extraction of circles, ellipses and other parametric curves from images. The Hough Transform was originally designed to find alignments of points (along lines, circles, ellipses or parametric curves). However the technique can be applied to find alignments of any type of features. The extraction of image edge points in the first phase of the Hough Transform is replace by the extraction of features from the image. The position and orientation of the features, and the associated uncertainties can then be fed to the Hough Transform similarly to the case of edge points.

Background Modeling forms a central module in surveillance systems using Computer Vision to detect events of interest in a video stream. Current methods use only the intensity observed at a pixel. Such a model is reasonable when the background is stationary. However, these methods deteriorate in discrimination power when the background is dynamic.

A method according to an embodiment of the present invention accounts for dynamic backgrounds that change according to a certain pattern.

Figure 7:
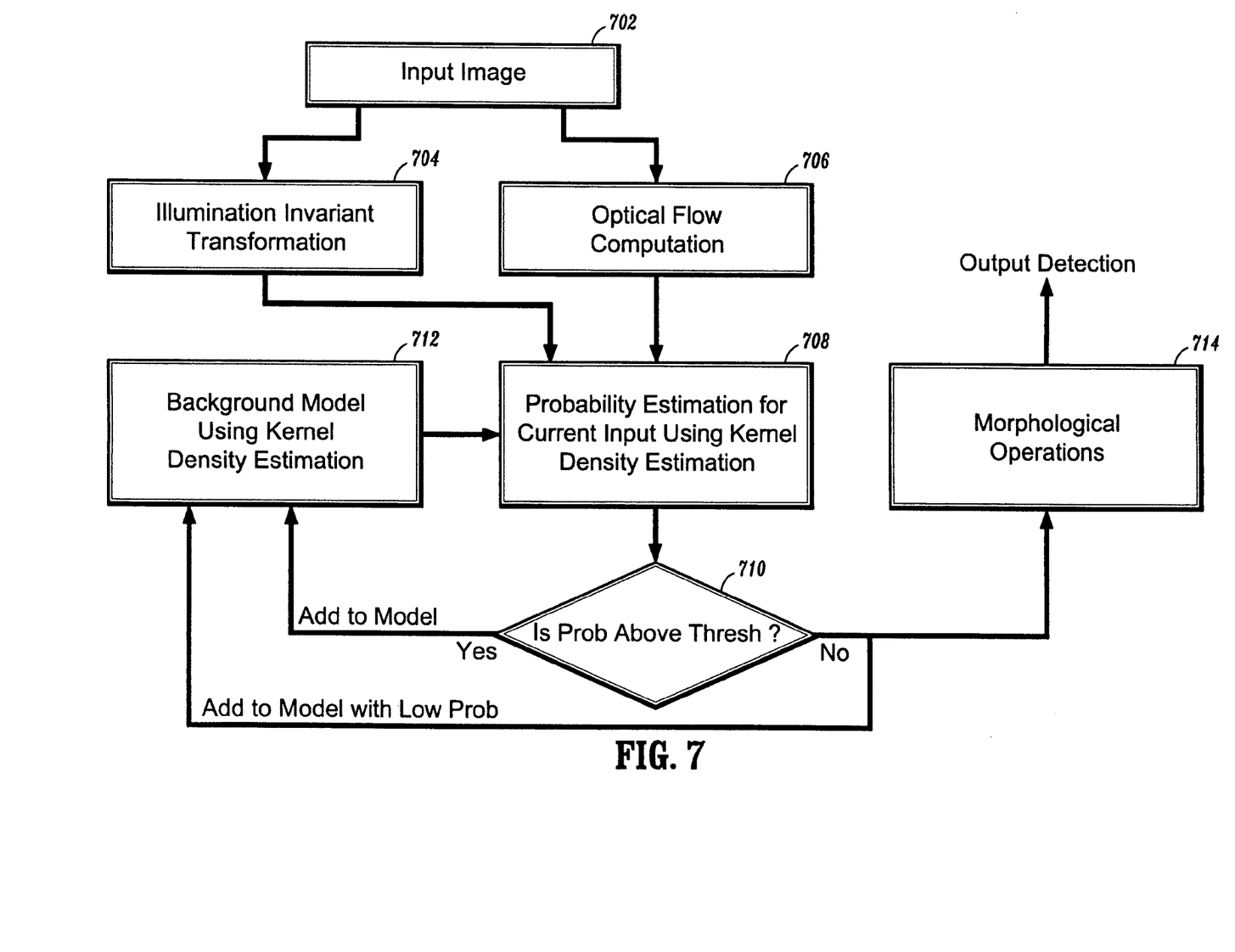
FIG. 7 is a flow diagram of a method according to an embodiment of the present invention.

Referring to FIG. 7, an input image 702 is entered into a system. Illumination Invariant transformation is performed on the image 704, as well as, an optical flow computation 706. A probability estimation for the current input is obtained using kernel density estimation 708. The probability is checked to determine if the probability is above a particular threshold 710, if it is above the threshold, a background model is updated using the kernel density estimation 712. If the probability is below the threshold 710, the background model is updated with low probability 712 and morphological operations 714 are used for output detection. The above process is now described in detail.

Once optical flow has been determined as described above, a probability distribution on the joint 5-D space of intensity (3 color components) and flow (2 flow components), can be constructed. Although the regular RGB space can be used, improved insensitivity to changes in illumination can be obtained if the normalized RG+intensity I space is used. The intensity is retained with a high variance so that some discriminability is retained between observations that may have the same chromaticity (that is, normalized r and g values) but very different intensities (for example, white, grey and black all have the same chromaticity).

Given previous observations of intensity and flow, the probability distribution can be developed in several ways. A method according to an embodiment of the present invention comprises kernel density estimation. Let $x_1, x_2, \ldots, x_n$ be n observations determined to belong to a model. The probability density function can be non-parametrically estimated (known as the Parzen window estimate in pattern recognition) using the kernel function K as $$Pr(x)=\frac{1}{n}\sum_{i=1}^{n}K(x-x_i)$$

Choosing a kernel estimator function, K, to be the Normal function, where $\Sigma$ represents the kernel function bandwidth, then the density can be written as $$Pr(x)=\frac{1}{n}\sum_{i=1}^{n}\frac{1}{(2\pi)^{\frac{d}{2}}|\Sigma|^{\frac{1}{2}}}e^{-\frac{1}{2}(x-x_i)^T\Sigma^{-1}(x-x_i)}$$

The combined covariance matrix n is derived from the covariances for the normalized color and optical flow. A general form for the covariance matrix can be derived, but for simplicity, the case where the cross-covariance between intensity and optical flow is zero, is described. For the covariance of the intensity of color in invariant space, the formula described in Error Propagation in Invariant Space can be used: Assuming that the cross-covariance between intensity and flow is zero, the combined covariance matrix can be written as:

$$\Sigma = \begin{bmatrix} \frac{\sigma^2}{S^2} \begin{pmatrix} \left(1 - \frac{2R}{S} + \frac{3R^2}{S^2}\right)\left(-\frac{R+G}{S} + \frac{3RG}{S^2}\right) \\ \left(-\frac{R+G}{S} + \frac{3RG}{S^2}\right)\left(1 - \frac{2G}{S} + \frac{3G^2}{S^2}\right) \end{pmatrix} & 0 & 0 \\ 0 & \sigma_i & 0 \\ 0 & 0 & \Lambda_f \end{bmatrix},$$

where 0's represent the appropriate zero matrices. In the above formula, $\sigma_i$ represents the standard deviation of the intensity and $\Lambda_f$ represents the covariance of the motion flow.

For each new observation, the probability is calculated using the above equations. If the probability is below a certain value, the pixel is new. This is determined for each pixel in the scene and detection is performed after applying morphological operations so that noise is removed. Information about the size of the objects is used so that only objects above a certain size are detected. This is done by not only using pixels connected to each other, but also by using those pixels that might not be connected but can otherwise belong to an object.

Mixture Model—based and kernel-based methods use only the intensity feature to build a probability distribution on the RGB (or normalized RGB) space. When using only the intensity feature, objects having colors similar to the background, cannot be detected. People camouflaged according to the color of the background can easily escape detection using this model. The problem becomes more severe if the background is dynamic, such as, ocean waves, waving trees, and moving clouds etc, and a wide variety of intensities can be observed at a particular pixel. Having such a wide spectrum in the observation means that the discriminability of such a system will be very low and many objects will not be detected. Using the flow feature along with the intensity helps us to detect not only objects having a different color than the background, but also objects that might have the same color characteristics as background, but move in a direction that is different from the direction of motion of the background. The discriminability of such a system will be retained even in the presence of dynamic backgrounds.

The probability density function in joint spatial-color domain will now be described. Following color transformation from RGB to normalized rg space, each image pixel z is characterized by a location $x=(x_1,x_2)^T$ and a color $c=(c_1,c_2)^T \equiv (r,g)^T$. An input image of n pixels is represented as a collection of d=4-dimensional points $z_i=(x_i^T,c_i^T)^T$ with i=1 . . . n[2]. The 4-dimensional space constructed is called joint spatial-color domain.

The task of image segmentation reduces to partitioning of data points $z_i$ according to their probability density. The number of image segments is determined by the number of modes in the joint space, while segment delineation is defined by the valleys that separate the modes.

To estimate probability density in joint space, a product kernel with variable bandwidth for color coordinates is utilized. The rationale is that in normalized color space the uncertainty varies with the location, as illustrated above. It has been proven that by adapting the kernel bandwidth to the statistics of the data, the estimation bias decreases. The bandwidth matrix associated with the color component of data point i is denoted by $H_i=\text{diag}\{h_{i1}^2, h_{i2}^2\}$. $H_i$ quantifies the uncertainty of $c_i$. The bandwidth for the spatial domain is taken constant and isotropic, that is, $H=hI_2$ where $I_2$ is the unit matrix of dimension 2.

The density estimator with normal kernel computed at location $z=(x^T,c^T)^T$ is given by $$\hat{f}(z) = \frac{1}{n(2\pi)^{d/2}} \sum_{i=1}^{n} \frac{1}{h^2} \exp\left(-\frac{1}{2}d^2(x, x_i, H)\right) \times \frac{1}{h_{i1}h_{i2}} \exp\left(-\frac{1}{2}d^2(c, c_i, H)\right)$$

where $$d^2(c,c_i,H) \equiv (c-c_i)^T H_i^{-1}(c-c_i)$$

is the Mahalanobis distance from c to $c_i$. A similar definition holds for $d^2(x,x_i,H)$.

Using the notations $$\alpha_i(x) = \frac{1}{h^2} \exp\left(-\frac{1}{2}d^2(x, x_i, H)\right)$$

and $$\beta_i(c) = \frac{1}{h_{i1}h_{i2}} \exp\left(-\frac{1}{2}d^2(c, c_i, H)\right)$$

the density estimator becomes $$\hat{f}(z) = \frac{1}{n(2\pi)^{d/2}} \sum_{i=1}^{n} \alpha_i(x)\beta_i(c).$$

The variable bandwidth mean shift equations for mode detection are now described. Additionally, computation of local modes, that is, peaks, of the density function are now described. Mode detection in joint space employs mean shift iterations for both x and c components of z. By taking the gradient of $$\hat{f}(z) = \frac{1}{n(2\pi)^{d/2}} \sum_{i=1}^{n} \alpha_i(x)\beta_i(c)$$

with respect to x, it results that the mean shift vector for the x component is given by $$m_x(z) = \frac{\sum_{i=1}^{n} \alpha_i(x)\beta_i(c)x_i}{\sum_{i=1}^{n} \alpha_i(x)\beta_i(c)} - x.$$

The gradient of $$\hat{f}(z) = \frac{1}{n(2\pi)^{d/2}} \sum_{i=1}^{n} \alpha_i(x)\beta_i(c)$$

with respect to c yields a mean shift vector for the c component $$m_c(z) = H_c(z) \sum_{i=1}^{n} \alpha_i(x) \beta_i(c) H_i^{-1} c_i - c$$

where $$H_c(z) = \left( \sum_{i=1}^{n} \alpha_i(x) \beta_i(c) H_i^{-1} \right)$$

The above gradients with respect to x and c, provide the components of the joint mean shift vector $$m(z) = (m_x^T(z), m_r^T(z))^T$$

The iterative computation of the above vector and translation of z by that amount, leads to a local mode, that is, peak, of the density. Strictly speaking, the mean shift iterations lead to a stationary point. Additional precautions should be taken to make certain that the convergence point is a local maximum.

The segmentation procedure is now described. By estimating, the sensor noise $$\sum_{\hat{r},\hat{g}} = \begin{pmatrix} \sigma_{\hat{r}}^2 = E[(\hat{r}-r)^2] & E[(\hat{r}-r)(\hat{g}-g)] \\ E[(\hat{r}-r)(\hat{g}-g)] & \sigma_{\hat{g}}^2 = E[(\hat{g}-g)^2] \end{pmatrix}$$

$$= \frac{\sigma^2}{S^2} \begin{pmatrix} 1 - \frac{2R}{s} + 3\frac{R^2}{s^2} & -\frac{R+G}{s} + 3\frac{RG}{s^2} \\ -\frac{R+G}{s} + 3\frac{RG}{s^2} & 1 - \frac{2G}{s} + 3\frac{G^2}{s^2} \end{pmatrix}$$

can be employed to compute the covariance matrix associated with the normalized color of each pixel. The components of the color bandwidth matrix $H_i = \text{diag}\{h_{i1}^2, h_{i2}^2\}$ are taken proportionally to $\sigma_r^2$ and $\sigma_k^2$, respectively. The mode estimation process is thus adapted to the local uncertainty in the data. In this implementation the contribution of $E[(\hat{r}-r)(\hat{g}-g)]$ is neglected.

Using the algorithm described above, the modes in the joint space are first detected. Since plateaus may appear in the density function, the modes that are sufficiently closed to each other are grouped together and a label is assigned to each group. The metric for distance evaluation is based on the matrices H and $H_c(z)$, computed in the convergence point. Region delineation is then obtained by associating each pixel to its mode and assigning the label of the group to which the mode belongs to.

Segmentation in normalized subspace is thus particularly advantageous when frames of a video sequence are known to contain shadows or illumination effects. At the same time, a decrease in resolution occurs, for example the chair feet are not recovered in the normalized space. Additionally, the generality of the proposed framework is shown. Various embodiments according to the present invention can additionally be applied to other illumination or geometric invariants.

A method according to the present invention can be used for object detection in a variety of scenes. The present invention can be used in applications, such as, traffic monitoring, surveillance systems in the presence of moving backgrounds, for example, waving trees, and ocean waves, activity detection, automatic traffic lights, monitoring in high security areas, and delineating people in a scene for detection. In many of these applications, the background might be dynamic and has be discounted. This is not possible with current prior art background adaptation methods. The present invention advantageously allows dealing with more complex scenes, and gets better results in scenes where prior art methods are currently being used.

The teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more Central Processing Units ("CPUs"), a Random Access Memory ("RAM"), and Input/Output ("I/O") interfaces. The computer platform may also include an operating system and micro instruction code. The various processes and functions described herein may be either part of the micro instruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for modeling a background of a video image, the method comprising:
    generating, by a processor, a combined covariance matrix from covariances for colors of the video image and an optical flow of the input image;
    estimating, by the processor, a probability density from performing a kernel density estimation on the combined covariance matrix; and
    updating, by the processor, the background model using the estimated probability density.

2. The method of claim 1, further comprising adding a vector of features of a video frame to said background model.

3. The method of claim 1, further comprising detecting a change between a video frame and the video image by evaluating a vector of features of the video frame and said background model.

4. The method of claim 3, wherein detecting the change includes determining if said vector of features exceeds a threshold and adjusting said background model accordingly.

5. The method of claim 3, further comprising applying morphological operations to said detections.

6. A non-transitory tangible computer readable storage medium tangibly embodying a program of instructions executable by the machine to perform method steps for modeling a background of an video image the method steps comprising:
  generating a combined covariance matrix from a covariance for colors of the video image and a covariance of an optical flow of the video image;
  estimating a probability density from performing a kernel density estimation on the combined covariance matrix; and
  updating the background model using the estimated probability density.

7. The computer readable storage medium of claim 6, wherein the method further comprises adding a vector of features of a video frame to said background model.

8. The computer readable storage medium of claim 6, wherein the method further comprises detecting a change between a video frame and the video image by evaluating a vector of features of the video frame and said background model.

9. The computer readable storage medium of claim 8, wherein detecting the change includes determining if said vector of features exceeds a threshold and adjusting said background model accordingly.

10. The program computer readable storage medium of claim 8, wherein the method further comprises applying morphological operations to said detections.

11. The method of claim 1, wherein generating the combined covariance matrix comprises:
  performing an illumination invariant transformation on the colors: and
  generating a combined covariance matrix from a covariance of the transformation and the covariance of the optical flow.

12. The method of claim 1, wherein estimating the probability density comprises performing a variable bandwidth mean shift on the video image using the combined covariance matrix.

13. The method of claim 12, wherein the variable bandwidth mean shift uses a product kernel with a variable bandwidth for coordinates of the colors.

14. The computer readable storage medium of claim 6, wherein generating the combined covariance matrix comprises:
  performing an illumination invariant transformation on the colors; and
  generating a combined covariance matrix from a covariance of the transformation and the covariance of the optical flow.

15. The computer readable storage medium of claim 6, wherein estimating the probability density comprises performing a variable bandwidth mean shift on the video image using the combined covariance matrix.

16. The computer readable storage medium of claim 15, wherein the variable bandwidth mean shift uses a product kernel with a variable bandwidth for coordinates of the colors.

17. A method for modeling a background of a video image, the method comprising:
  generating, by a processor, a combined covariance matrix from covariances of a joint motion-color feature space of the video image;
  estimating, by the processor, a probability density from performing a kernel dens estimation on the combined covariance matrix; and
  updating, by the processor, the background model using the estimated probability density.

18. The method of claim 17, wherein generating the combined covariance matrix comprises:
  performing an illumination invariant transformation on colors of the feature space; and
  generating a combined covariance matrix from a covariance of the transformation and a covariance of motions of the feature space.

19. The method of claim 18, wherein estimating the probability density comprises performing a variable bandwidth mean shift on the video image using the combined covariance matrix.

20. The method of claim 19, wherein the variable bandwidth mean shift uses a product kernel with a variable bandwidth for coordinates of colors of the feature space.

* * * * *